(12) United States Patent
Hottinen

(10) Patent No.: US 7,447,270 B1
(45) Date of Patent: Nov. 4, 2008

(54) METHOD FOR CONTROLLING THE DATA SIGNAL WEIGHTING IN MULTI-ELEMENT TRANSCEIVERS AND CORRESPONDING DEVICES AND TELECOMMUNICATIONS NETWORK

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 445 days.

(21) Appl. No.: 10/432,010

(22) PCT Filed: Nov. 17, 2000

(86) PCT No.: PCT/EP00/11449

§ 371 (c)(1),
(2), (4) Date: Oct. 22, 2003

(87) PCT Pub. No.: WO02/41524

PCT Pub. Date: May 23, 2002

(51) Int. Cl.
*H04B 7/02* (2006.01)
*H04B 7/06* (2006.01)
*H04B 1/69* (2006.01)

(52) U.S. Cl. .................. 375/267; 375/299; 375/141; 375/144

(58) Field of Classification Search .............. 375/221, 375/219, 267; 455/101, 103
See application file for complete search history.

(56) References Cited

U.S. PATENT DOCUMENTS 5,532,700 A * 7/1996 Lockwood .................. 342/378
5,634,199 A * 5/1997 Gerlach et al. .............. 455/63.1
5,819,168 A * 10/1998 Golden et al. ............... 455/303
6,038,450 A * 3/2000 Brink et al. ................. 455/442
6,041,237 A * 3/2000 Farsakh ...................... 455/450

(Continued)

FOREIGN PATENT DOCUMENTS

GB          2313261          11/1997

(Continued)

OTHER PUBLICATIONS

Bradaric et al, Design low rank estimator for higher-order statistics based on the second-order statistics, 1999. Proceedings of the IEEE Signal Processing Workshop on Jun. 14-16, 1999 pp. 66-69.*

(Continued)

*Primary Examiner*—Tesfaldet Bocure
(74) *Attorney, Agent, or Firm*—Foley & Lardner LLP

(57) ABSTRACT

The invention relates to a method for controlling the weighting of a data signal in the at least two antenna elements of a multi-element transceiver 1 of a telecommunications network, which data signal is to be transmitted by at least one weighting vector from the transceiver 1 to a terminal 2. For improving such a method, the invention comprises: receiving signals transmitted by the transceiver 1 at the terminal 2; determining for each antenna element a value w(i) indicative of the short term variations; transmitting the values w(i) to the transceiver 1; estimating, based on those values w(i), coefficients e(i) indicative of the stationary structure of the received signals; and weighting the data signal S in the antenna elements with the coefficients e(i). Alternatively, such coefficients e(i) are determined already in the user equipment 2 and transmitted in bursts to the transceiver 1 for controlling the distribution of a data signal to the antenna elements. Similar methods are proposed for soft handover.

44 Claims, 3 Drawing Sheets

U.S. PATENT DOCUMENTS

| | | | |
|---|---|---|---|
| 6,067,324 A | | 5/2000 | Harrison |
| 6,144,654 A | * | 11/2000 | Ibanez-Meier et al. ...... 370/342 |
| 6,154,485 A | * | 11/2000 | Harrison .................... 375/130 |
| 6,246,715 B1 | * | 6/2001 | Park et al. ................... 375/146 |
| 6,574,212 B1 | * | 6/2003 | Jurgensen et al. ........... 370/348 |
| 6,594,473 B1 | * | 7/2003 | Dabak et al. ................ 455/101 |
| 6,643,813 B1 | * | 11/2003 | Johansson et al. ........... 714/748 |
| 6,804,311 B1 | * | 10/2004 | Dabak et al. ................ 375/347 |
| 7,099,630 B2 | * | 8/2006 | Brunner et al. ............... 455/69 |
| 2001/0033248 A1 | * | 10/2001 | Owechko .................... 342/371 |

FOREIGN PATENT DOCUMENTS

WO            00/36764        6/2000

OTHER PUBLICATIONS

Hottinen, et al., "Closed-Loop Transmit Diversity Techniques for Multi-Element Transceivers", VYC 2000, pp. 70-73.

"Advanced Closed Loop Tx Diversity Concept (eigenbeamformer)", 3GPPTSGRANWGI, Meeting #14, Jul. 4-7, 2000, Oulu, Finland, pp. 1-12.

Physical Layer-General Description, 3GPPTSGRANWG1, TS 25.201, V2.1.1 (Jun. 1999), pp. 1-13.

Multiplexing and Channel Coding, 3GPPTSGRANWG1, TS S1.12, V1.1.0 (Mar. 1999), pp. 1-41.

3G TS 25.211, V3.3.0 (Jun. 2000), pp. 1-42.

3G TS 25.214, V3.3.0 (Jun. 2000), pp. 1-44.

Gerlach, et al., "Adaptive Transmitting Antenna Arrays with Feedback", IEEE Signal Processing Letters, vol. 1, No. 10, Oct. 1994, pp. 150-152.

"An Extension of Closed Loop Tx Diversity Mode 1 for Multiple Tx Antennas", 3GPPTSGRANWG1, Meeting #13, May 22-25, 2000, Tokyo, Japan, pp. 1(1)-8(8).

Hottinen, et al., "Soft-Weighted Transmit Diversity for WCDMA", Proceed in on Altron Conf Sep. 1999.

Cardoso, et al., "Blind Beamforming for Non Gaussian Signals", IEE-Proceedings-F, vol. 140, No. 6, pp. 362-370, Dec. 1993.

Cardoso, et al., "Independent Component Analysis, A Survey of Some Algebraic Methods", ISCAS 96, 1996 vol. 2 pp. 93-96.

* cited by examiner

Fig. 1a (Prior Art)

| Slot # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| short term FB bits | 1 | 1 | 1 | 1 | 1 | 1 | 1 | 1 | 1 | 1 | 1 | 1 | 1 | 1 | 0 |
| long term FB bits | 0 | 0 | 0 | 0 | 0 | 0 | 0 | 0 | 0 | 0 | 0 | 0 | 0 | 0 | 1 |

Fig. 1b (Prior Art)

| Slot # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| short term FB bits | 1 | 1 | 0 | 1 | 0 | 1 | 1 | 1 | 1 | 0 | 1 | 1 | 1 | 1 | 0 |
| long term FB bits | 0 | 0 | 0 | 0 | 1 | 0 | 0 | 0 | 0 | 1 | 0 | 0 | 0 | 0 | 1 |

Fig. 1c (Prior Art)

| Slot # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| short term FB bits | 0 | 0 | 1 | 1 | 1 | 1 | 0 | 0 | 0 | 0 | 0 | 0 | 0 | 0 | 0 |
| long term FB bits | 1 | 1 | 1 | 1 | 1 | 1 | 1 | 1 | 1 | 1 | 1 | 1 | 1 | 1 | 1 |

METHOD FOR CONTROLLING THE DATA SIGNAL WEIGHTING IN MULTI-ELEMENT TRANSCEIVERS AND CORRESPONDING DEVICES AND TELECOMMUNICATIONS NETWORK

BACKGROUND OF THE INVENTION

1. Field of the Invention

The invention relates to a method for controlling the weighting of a data signal in the at least two antenna elements of a multi-element transceiver of a telecommunications network, which data signal is to be transmitted by at least one weighting vector from said transceiver to a terminal. The invention equally relates to a method for controlling the weighting of a data signal in the antenna elements of a first and at least a second transceiver of a telecommunications network, when a terminal is in soft handover with the first and at least the second transceiver. The invention moreover relates to such a transceiver and a module in such a transceiver, to such a terminal and a module in such a terminal and such a telecommunications network.

2. Description of the Prior Art

For telecommunications systems, in particular for systems using WCDMA (wideband code division multiple access), it is known to use base stations with several transmit antenna elements in order to be able to provide for transmission diversity. The antenna elements are controlled with complex coefficient weight vectors, each weight vector forming a beam in a certain direction, and where each weight vector transmits a set of modulated signals. Corresponding user equipment requires at least one antenna for reception, which also extracts the statistical characteristics of the channel using a pilot signal or a training signal transmitted from the base station or from any other multi-element transmitter or transceiver.

In order to control the weighting of two antenna elements of a transceiver effectively, that is by taking into account changing transmission paths to the terminal, it has been proposed in the WCDMA specification: "3GPP RAN WG1, Physical Layer-General Description", v. 2.0.0, April 1999, to exploit short-term channel fluctuations estimated in the terminal and fed back to the transceiver. Proceeding from this specification, the document by Ari Hottinen, Olav Tirkkonen, Risto Wichman, Nokia Research Center: "Closed-Loop Transmit Diversity Techniques for Multi-Element Transceivers" discloses different concepts for using short term feedback information for transceivers with more than two antenna elements.

In one alternative, with the assumption of correlated spatial channels and a specific parameterized weight set for the antenna array with M elements, a particular parameterized beam-forming concept is used in which the transmit weight/array vector, parameterized by θ is given by:

$$w(\theta) = [1, e^{(j2\pi d\ sin(\theta))/\lambda}, \ldots, e^{(j2\pi(M-1)d\ sin(\theta))/\lambda}]^T/\sqrt{M},$$

where d is the distance between the elements in the array.

For example, with a Uniform Linear Array (ULA) d=λ/2 is set, where λ is the carrier wavelength. The feedback can be calculated for example using the eigenvector corresponding to the largest eigenvalue of the channel matrix $H^H H$, where $H=(h_1, \ldots, h_M)$ and where $h_m$ is the impulse response vector between the m array element and the terminal. When denoting this eigenvector by $e_{max}$ and solving $$\theta^* = \underset{\theta}{\operatorname{argmax}} \|w(\theta)^H e_{max}\|^2,$$

the phase at the transmit element m is $w_m = e^{(j2\pi(m-1)d\ sin(\square)/\square)}$. Then, the same relative phase, calculated using common channel measurements, is used between all neighboring transmitting elements. Thus, in this example only one coefficient has to be signalled to the network regardless of the number of transmitting elements. It is not necessary here for the terminal to know precisely the antenna structure of the transceiver, as it is in this example sufficient only to know (and signal information related to) the relative phase difference between antenna elements. It is clear that other array structures have different parameterizations. Alternatively the terminal can transmit simply the eigenvector coefficients and let the transceiver quantize the received eigenvector to the best matching parameterized array manifold. In the ULA (Uniform Linear Array) case this manifold is represented by w(O) above.

It is mentioned in the document that in the presence of high Doppler frequencies (e.g. at velocities above 50 km/h) the feedback modes show diminishing returns, or even performance degradation when compared to open-loop concepts (including single antenna transmission). The performance degradation at high speeds is in part due to signalling inaccuracies and in part due to exacerbated channel estimation problems in closed-loop modes. Even though it is indicated that different techniques can be applied to improve the performance in higher Doppler frequencies, long term spatial channel properties are not dealt with. Accordingly, the proposed methods are only beneficial with slowly time varying channels or when the control is sufficiently accurate within the channel time coherence. Moreover, the structural properties related to the downlink channel are not taken into account.

The document "Advanced closed loop Tx diversity concept (eigenbeamformer)", 3GPP TSG RAN WG 1, TSGR1#14 (00)0853 Meeting #14, Jul. 4-7, 2000, Oulu, Finland, by Siemens describes a possibility of taking into account the long term variations as well.

This document is aimed at three channel classes that are to benefit from the proposed method. The first class includes spatially uncorrelated channels. A second class included spatially coherent channels which are frequency non-selective. The third class, which is considered as most important class, includes spatially coherent channels which are frequency selective or spatially partially correlated channels. In this class, the received signal deteriorates when using only short term feedback information, if the terminal exceeds the velocity threshold imposed by the coherence time and the feedback bandwidth. Accordingly, the velocity threshold for the terminal is to be increased.

To this end, the dominant eigenbeams are calculated in the terminal by estimating long term spatial signal covariance matrices from received vectors of spatial channel estimation of the n-th temporal tap and carrying out an eigenanalysis on those matrices. Each resulting eigenvector with a complex number for each antenna element constitutes an eigenbeam. The dominant eigenbeams are fed back to the transceiver. A feedback rate of 1500 bps is proposed for the downlink eigenbeamformer. The long term information bits for the eigenbeams and the short term information bits for eigenbeam selection are multiplexed over 15 slots as illustrated in three examples in FIGS. 1a, 1b and 1c.

Several problems are either not addressed in this document or the proposed solutions are unsatisfactory when considering many crucial aspects required by a working solution. As an example, the method proposed for signalling the long term channel information to the transceiver is unsatisfactory. In addition, the required signalling reliabilities for the long term channel and the short term channel vectors are not addressed, and the joint efficient use of downlink channel structures in the presence of common and dedicated pilot channels are neglected.

SUMMARY OF THE INVENTION

The invention improves the methods for controlling the weighting of a data signal in the at least two antenna elements of a multi-element transceiver of a telecommunications network known from the state of the art. The invention provides a base station, a user equipment and a wireless communications system suitable for realizing such a method.

A method for controlling the weighting of a data signal in the at least two antenna elements of a multi-element transceiver of a telecommunications network, which data signal is to be transmitted by at least one weighting vector from the transceiver to a terminal, and which antenna elements form at least two transmit paths to the terminal comprises:

receiving signals transmitted by the transceiver via each transmit path at the terminal;
determining for each transmit path a value indicative of the short term variations of the signals;
transmitting the values to the transceiver;
estimating based on the received values coefficients indicative of the stationary structure of the received signals; and
weighting the data signal in the antenna elements with said coefficients.

The invention uses an indirect feedback of long term values. Short term feedback information is transmitted from the terminal to the transceiver, and only in the transceiver coefficients indicative of the stationary structure of the transmission channels between transceiver and terminal are estimated. This is economical in, particular, when a fast feedback is employed anyhow for taking care of short term variations. The same signalling information can be used for calculating the relevant subspaces in the transceiver. This makes the realization particularly simple, since extra signalling can be avoided completely. In fast fading channels the transceiver can then transmit the signal to the dominant subspace(s) calculated from of the received signal, whereas in a slow fading channel the transceiver can use the instantaneous feedback signals in transmit antenna element weighting.

A method for controlling the weighting of a data signal in the at least two antenna elements of a multi-element transceiver of a telecommunications network, which data signal is to be transmitted by at least one weighting vector from the transceiver to a terminal, and which antenna elements form at least two transmit paths to the terminal comprises:

receiving signals transmitted by the transceiver via each transmit path at the terminal;
determining a set of coefficients for each transmit path indicative of the dominant stationary structure in the received signals;
transmitting the coefficients to the base station in a burst; and
controlling the weighting of a data signal in the antenna elements of the transceiver with the coefficients.

In contrast to the known long term feedback, in which bits are transmitted constantly and distributed to predetermined slots, the invention uses a transmission in bursts, which allows for a variety of advantageous treatments.

Both methods provide reliable information on the stationary structure of the channels between a multi-element transceiver, in particular a base station, and a terminal, in particular a user equipment. The second method, however, provides exact structural coefficients calculated at the terminal, while the first method provides estimated structural coefficients determined at the transceiver, but in a more simple way.

A method for controlling the weighting of a data signal in the antenna elements of a first and at least a second transceiver of a telecommunications network, when a terminal is in soft handover with the first and at least the second transceiver of which at least the first one is a multi-element transceiver, which data signal is to be transmitted from the transceivers to the terminal, the data signal being transmitted at least from the first transceiver by at least one weighting vector, and which antenna elements of the first transceiver form at least two transmit paths to the terminal comprises:

receiving signals transmitted by the first and at least the second transceiver via each transmit path at the terminal;
determining in the terminal separately for each transceiver a set of coefficients for each transmit path from the respective transceiver indicative of the dominant stationary structure in signals received from the respective transceiver;
transmitting the set of coefficients separately to the respective transceiver; and
controlling the weighting of a data signal in the antenna elements of the transceivers with the respectively received set of coefficients.

Alternatively, the method of the invention comprises:
receiving signals transmitted by the first and at least the second transceiver via each transmit path at the terminal;
determining in the terminal a set of coefficients for each of the transmit paths of both of the transceivers indicative of the dominant stationary structure in the signals received from both transceivers;
transmitting the same determined sets of coefficients to both of the transceivers; and
controlling the weighting of a data signal in the antenna elements of the transceivers with the same determined sets of coefficients.

Both latter alternatives of the invention improve the known methods for controlling the weighting of a data signal in the at least two antenna elements of a multi-element transceiver of a telecommunications network, when this transceiver is involved in a soft handover. The second transceiver involved in the soft handover may or may not be a multi-element transceiver. With the methods, a long term feedback for transceivers involved in a soft handover becomes possible.

In the second method according to the invention, the structural coefficients can be calculated and signalled for each transceiver separately, which leads to an optimized weighting in the transceivers.

In order to reduce the required feedback signalling capacity, the fourth method according to the invention calculates a set of structural coefficients using all channel estimates of each transmit path between the two transceivers and the terminal. Then, the same coefficients are transmitted to both of the transceivers. The coefficients are not necessarily transmitted separately to each transceiver. For example, in CDMA systems, with uplink in soft handover, the same transmission is received by all base stations. The same coefficients are applied in both transceivers involved in the soft handover.

In all four methods, each transmit path can be formed by one antenna element or by a group of antenna elements.

The invention is achieved with a transceiver, in particular a base station, with at least two antenna elements and by a terminal, in particular a user equipment, with at least one antenna element comprising means respectively for realizing one of the methods according to the invention. The invention is also a transceiver module and with a terminal module for a transceiver and a terminal of a telecommunications network respectively which comprise means respectively for realizing one of the methods according to the invention. Finally, the invention also is a wireless communications system with at least one transceiver and at least one terminal suitable for realizing one of the methods according to the invention.

In all four alternative methods, the signal transmitted from the transceiver to the terminal should contain a pilot signal, the distribution of which to the different transmission paths is known in the terminal just as the signal itself so that values or coefficients can be easily calculated in the terminal.

In the first method, other indirect techniques can be combined with the calculation of the coefficients for obtaining weight vectors. As an example, dominant beams can be calculated from received data signals (as opposed to special signals with the channel state information) in uplink, if the transceiver antenna array is calibrated. The blindly (implicitly) estimated weight vectors can then be combined with those obtained by feedback. For example, the dominant beam can be a weighted average of the weight vectors calculated in the aforementioned two ways. Alternatively, the dominant weight vector(s) can be calculated as dominant eigenvectors of an average of spatial correlation matrices, one obtained as explicit feedback and one from implicit feedback.

In a preferred embodiment of the first method of the invention, weight vectors for short term fading are determined in the terminal and transmitted to the transceiver as values characteristic for the signals from different antennas. The feedback weight can be estimated by the terminal by any signalling method from which the channel parameters can be extracted, for example one of the methods proposed in the above cited document "Closed-loop transmit diversity techniques for multi-element transceivers".

In an equally preferred embodiment of the first method of the invention, at least two samples for each antenna element in the received values are used in the transceiver for estimating spatial signal covariance matrices. Afterwards, the diversity vectors calculated from the covariance matrices are determined for example in an eigenanalysis, the diversity vectors providing the coefficients used for controlling the weighting of the data signal. If one eigenvector per antenna element is determined, the eigenvectors corresponding to the strongest eigenvalues indicate which beams (eigenbeams) are preferred.

Alternatively to determining the eigenvectors of a spatial instantaneous signal covariance matrix, the received values can be used to determine structural coefficients after FIR (Finite Impulse Response) or IIR (Infinite Impulse Response) filtering applied to the received samples or to the respective correlation matrices.

In a further preferred embodiment of the first method of the invention, structural coefficients are used in the transceiver for transmitting data signals with the determined preferred beams, and additionally, the terminal makes use of the determined short term values for weighting the preferred beams or selecting one of the preferred beams for the transmission of the data signal.

The received values can include for estimating the structural coefficients weight vectors or signal statistics or a combination thereof. The estimated coefficients can be transmitted to the terminal, for example by reliable signaling. The terminal can calculate the effective received channel as it knows the channel coefficients (matrix H), measured for example from pilot channels, and the reliably signaled preferred (dominant) beams. The terminal can then use short term feedback to distribute or weight the transmitted information in or to at least two weight vectors.

If the transceiver transmits a signal to the terminal indicating at least the weight information currently used for forming stationary beams, the terminal does not have to estimate the used linear combination applied to the matrix H in the transmitter. Estimation could be done with the aid of pilot or training signals in a dedicated beam, the dedicated beam being typically some linear combination of the preferred (dominant) beams. Instead, to avoid estimation errors, the long term beam information can be included in a dedicated frame t and be coded for transmission to the terminal. Once the terminal has decoded this frame, the new long-term weight can be applied to the future frames t+N, with N>1. When dominant beams change, new weight information is calculated at the transceiver and then transmitted in coded format to the terminal at terminal request, upon transmitter decision, at predetermined frames, or any combination of these.

In the second method of the invention, the transmission of the stationary structure coefficients in bursts makes possible the transmission of the signal as message, that is, as a higher layer signal or a service instead of a layer 1 signal with predetermined information content and frame structure. Accordingly, the problem of defining new frame formats for multi-antenna systems is avoided, and the method can be easily used regardless of the antenna structure at the base station.

In particular, dominant weighting vectors can be transmitted as structural coefficients and therefore as long term feedback information. As an example, if dominant eigenvectors are transmitted as dominant weighting vectors to the transmitter, these eigenvectors can be calculated, for example, as described in the above cited document "Advanced closed loop Tx diversity concept (eigenbeamformer)". That is, at first, long term spatial signal covariance matrices are calculated from received vectors of spatial channel estimation of the n-th temporal tap and then an eigenanalysis is carried out on those matrices to obtain the eigenvectors.

Alternatively, the structure coefficients can be calculated by using an independent component analysis, as described for example by J. F. Cardoso and P. Comon in: "Independent Component Analysis, a Survey of Some Algebraic methods", Proc. ISCAS Conference, volume 2, pp. 93-96, Atlanta, May 1996, or by some high-order generalization of eigenanalysis which makes use of a higher order structure information (in addition to mean and covariance information) in the received signal and designates dominant weighting vectors.

In a preferred embodiment of the second method of the invention, the structural coefficients are encoded before transmission. This assures the terminal a better reliability that the coefficients reach the transceiver correctly, since coded transmissions yield a better error rate than uncoded transmission. A coding of the structural coefficients is possible and preferred, since the coefficients are transmitted as bursts, not in distributed slots, and since the structure in the long-term beams changes only slowly, depending on the velocity of the terminal and the environment. The reliability is particularly good, if the coefficients are coded together with other data (for example comprising other control information or information) to be transmitted in the uplink. In this case, the coding block is longer and therefore stronger. Alternatively, a separate encoder, for example a convolutional or block encoder, can be used for short frames with the long term feedback information. Basically, the encoding structure in the current multiplexing and rate matching concept can be used, that is if used with WCDMA it can also be considered as particular service in the rate matching algorithm of the WCDMA system with desired quality-of-service requirements. In one implementation the coefficients are coded together with Transport Format Control Indicator (TFCI) bits, defined in the WCDMA specification, which designate, among other things, the data rate information.

In a further preferred embodiment of the second method of the invention, a signal suited for error detection is added to the transmitted coefficients or included in the transmitted coded signal, for example a CRC (cyclic redundancy check) information. If the transceiver detects that the transmission was not free of errors, it can request from the terminal a repetition of the transmission. An error detection or an acknowledgement of the reception is not necessary, if the measurement result is encoded in the terminal with sufficient reliability.

When the long-term information is transmitted as coded bursts, the terminal can calculate the short term feedback for example as in the current two-element closed-loop concepts. The terminal can assume that the long-term beams are applied at the base station error-free in each antenna element and subsequently the terminal can calculate the effective channel. The effective channels calculated by the terminal are now given by h_eff(i)=H*e(i), where e(i) denotes the i-th dominant weightvector. As an example, with two dominant weight vectors, the terminal can use h_eff(1) and h_eff(2) in place of h1 and h2, as proposed in the above cited document "Closed-Loop Transmit Diversity Techniques for Multi-Element Transceivers" (or as proposed in the current two-element WCDMA closed-loop concept), in order to calculate the short-term feedback that determines how to combine or weight the known long-term beams in the transceiver. This is not practical if the terminal cannot be sure that the dominant vectors are reliable, since the effective channels would then be in error. Instead, then, a dedicated pilot channel, or a set of training symbols would need to be transmitted to the long-term beams. This would require additional changes to the WCDMA specification, rely too heavily on channel estimation, and add signalling overhead to downlink.

The transmission of the long term feedback information can take place regularly, or when requested by the terminal or when requested by the transceiver or a combination of the three.

When M antenna elements are used by a transceiver and eigenvectors are calculated as structural coefficients, one weight per antenna elements is determined for example by eigenanalysis in the terminal for each weightvector. Instead of transmitting M weight values for each eigenvector, however, only M–1 weight values have to be transmitted as feedback to the transceiver, since the determined direction of the beams is not affected by this reduction.

The methods of the invention can also be used in soft handover, where there are at least two transceivers and where at least one transceiver has multiple antenna elements. If the first method according to the invention is used in soft handover, each base station can signal the long-term weights separately to the terminal.

The third and the fourth method according to the invention enable the use of the second method according to the invention in soft handovers, except that the transmission of the determined structural coefficients in bursts is optional. All forms of the second method of the invention can also be used for the third and the fourth method of the invention.

As an example of the fourth method according to the invention, in which the same long-term weight vectors are applied in both transceivers, the terminal can calculate $$e^* = \mathrm{argmax}_{e: \|e\|=1} e^H \left( \sum_t \sum_k H_k^H(t) H_k(t) \right) e$$

This defines essentially the largest eigenvector corresponding to long-term channel correlation matrix $$R = \sum_t \sum_k H_k^H(t) H_k(t)$$

over base stations (index k) and over multiple time instants (t). In analogy with the single transceiver case, several methods exist to calculate diversity vectors from this correlation matrix, for example using eigenvalue decomposition, independent component analysis, and so on. Furthermore, the various recursive and computational efficient procedures exist for updating the correlation matrix or the corresponding diversity vectors. As is well known in the art, additional information for example estimated information on the noise covariance structure can be incorporated when calculating the diversity vectors. For example, if $R_I$ denotes the noise covariance structure in the signal, in place of eigenvalue decomposition a generalized eigenvalue decomposition of the matrix pair $(R_I, R)$ is computed. The use of eigenvalue decomposition thus implicitly assumes that the noise covariance is diagonal. The methods of the invention are described for simplicity using this assumption.

It is likely that in soft handover the use of long-term weight vectors may be sufficient and the short term feedback may not be needed at all. In the absence of short term feedback the base station can send information through dominant beams using any open-loop transmit diversity technique. For example, space-time encoded signals can be transmitted through the dominant beams, as shown for example in the above cited reference "Closed-loop transmit diversity techniques for multi-element transceivers". Alternatively, a SW-STTD (Soft-Weighted Space Time Transmit Diversity) embodiment as proposed in the document "Soft-Weighted Transmit Diversity for WCDMA" by A. Hottinen, R. Wichman and D. Rajan, Proceeding of Allerton Conference on Communications, Control, and Computing, Illinois, USA, September 1999, can be employed.

Preferably, the first and the second method according to the invention is used for WCDMA, in particular in UMTS (Universal Mobile Telecom System) networks or in UTRAN (UMTS Terrestrial Radio Access Network).

BRIEF DESCRIPTION OF THE DRAWINGS

In the following, the invention is explained in more detail with reference to drawings, of which FIGS. 1a-c show multiplexing formats for long term and short term feedback information of the prior art;

DETAILED DESCRIPTION OF THE INVENTION

FIGS. 1a-c have been already described with reference to the prior art.

Figure 2:
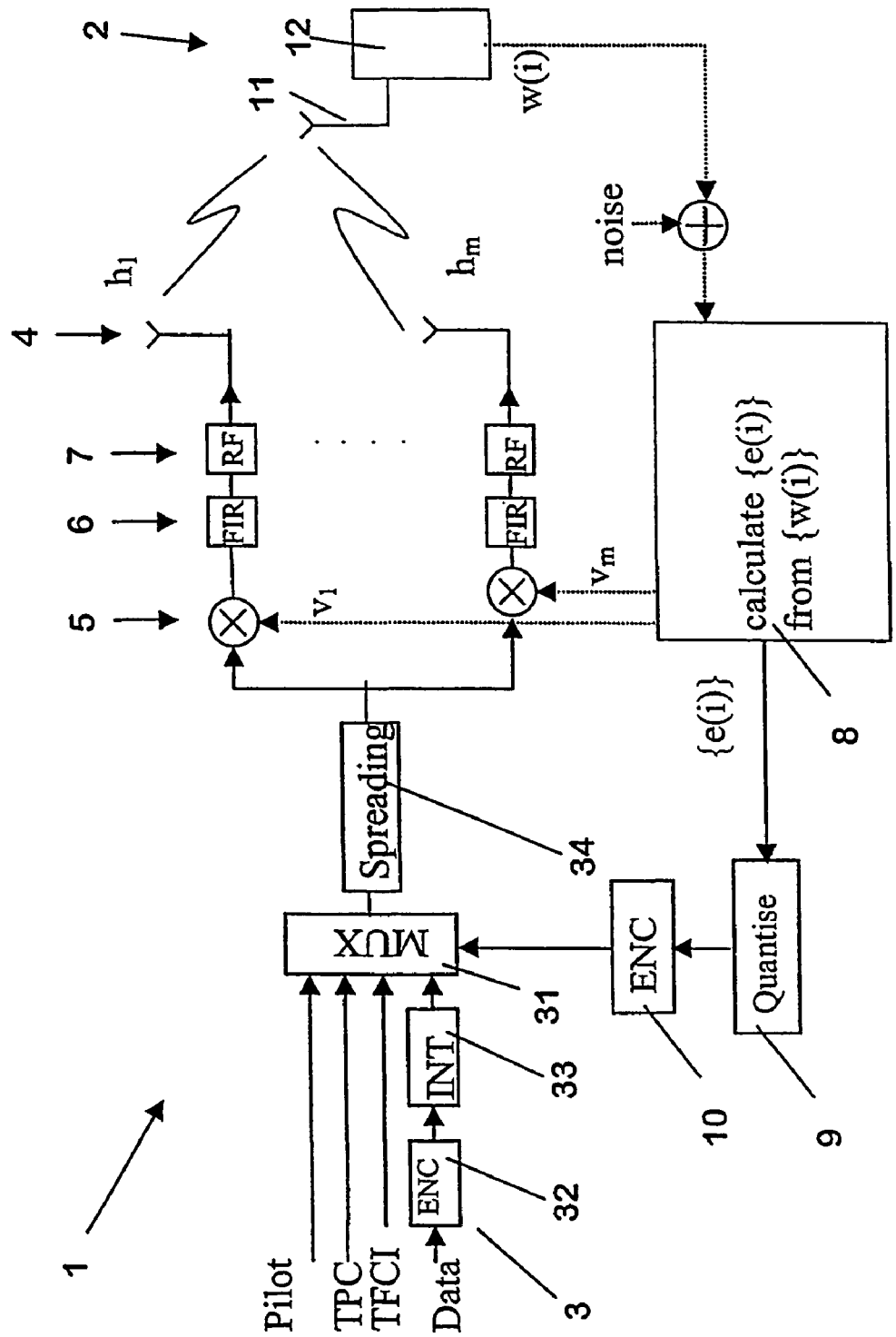
FIG. 2 illustrates the first method according to the invention.

FIG. 2 illustrates the first method according to the invention.

FIG. 2 shows on the left hand side components of a base station 1 as transceiver and on the right hand side a user equipment 2 as terminal. Base station 1 and user equipment 2 are part of a UMTS network with WCDMA.

For receiving and making available signals from the network, the base station 1 comprises a data supplying unit 3. In the data supplying unit 3, signal inputs for a pilot signal, for a Transmit Power Control TPC and for Transport Format Control Indicator bits TFCI are connected directly to a multiplexer 31. A signal input for the data signal is connected to the multiplexer 31 via an encoder 32 and an interleaving unit 33. The multiplexing unit 31 is connected via a spreading unit 34 to the output of the data supply unit 3. The base station 1 further comprises an antenna array with transmit antenna elements 4. The data supplying unit 3 is connected to each of the antenna elements 4 via a respective multiplier 5, a respective FIR filter 6 and a respective modulation unit 7. The base station 1 moreover comprises a processing unit 8 with access to the multipliers 5. The processing unit 8 is in addition connected to the multiplexing unit 31 via a quantizier 9 and a further encoder 10.

Of the user equipment 2, only an antenna element 11 and a processing unit 12 is depicted separately.

The base station 1 receives as input from the UMTS network data signals, a pilot signal, TPC and TFCI that are all to be transmitted to the user equipment 2. The data signal is first encoded in the encoder 32 and interleaving in the interleaving unit 33, before being multiplexed with the other signals in the multiplexer 31. The multiplexed signal is then spread in the spreading unit 34 for supplying them to the different antenna elements 4. The antenna elements 4 of the base station 1 are used for forming beams transmitting signals in different directions. To this end, the spread signal is weighted for each antenna element with an assigned weight $w_1$ to $w_m$ in the corresponding multiplier 5. Then, the signal for each antenna element is FIR filtered in the FIR filter 6 and RF (radio frequency) modulated in the modulation unit 7 before being output as RF signal. Each generated beam comprises a set of complex coefficient vectors.

The pilot signal that is transmitted by the base station 1 via the antenna elements 4 in parallel with the received data signals, has a predetermined weighting and a predetermined data sequence.

The user equipment 2 knows which pilot signal was used and how the signal was weighted in the different antenna elements. Therefore, in the processing unit 12 of the user equipment 2, short term variation weights w(i) can be estimated out of obtained channel estimates $h_1$ to $h_m$ for each of the m antenna elements 4 of the base station 1. The weights w(i) can be calculated in the user equipment, for example according to one of the methods described in the above cited document "Closed-loop transmit diversity techniques for multi-element transceivers", or in analogy with the above mentioned WCDMA specification by maximizing the power received at the user equipment 2:

$$P = w^H * H^H * H * w \text{ with } H = [h1\ h2\ \ldots]$$

where $h_n$ is the vector of spatial channel estimation of the n-th temporal tap and w the short term antenna weight vector composed of weights w(i). The weights w(i) are quantized with a low resolution, e.g. they may be either 1 or −1. Those weights w(i) are used on the one hand in the processing unit 12 of the user equipment 2 for selecting one of the received beams as preferred beam. On the other hand, they are transmitted in the uplink channel as feedback signals to the base station 1 wherein i indicates the slot in which a weight w(i) is transmitted.

The vector w is received in the processing unit 8 of the base station 1 with added noise. The processing unit 8 filters the received values (soft commands) using a forgetting factor ρ and estimates the long term spatial signal covariance matrix of the nth dominant temporal tap with the following equation:

$$R_n(i) = \rho R_n(i-1) + (1-\rho) w_n(i) w_n^H(i),$$

where i denotes the slot number. Proceeding from the estimated covariance matrices $R_n$, the processing unit 8 of the base station 1 performs an eigenanalysis in order to receive the eigenvectors with the equation:

$$R_n E^n = E_n \Theta_n$$

Matrices $\Theta_n$ comprise the eigenvalues of matrices $R_n$. The required eigenvectors are columns of the determined matrices $E_n$. The dominant eigenvectors indicate the long term weight vectors that are used best for transmission. Reliability information can be used to weight different feedback symbols differently. The eigenvalues do not represent the mean powers of each beam as the feedback does not contain channel power information. Nevertheless, the dominant eigenvector defines the dominant long term transmit weight vector, as this is likely to be the only stationary structure in the feedback signal.

Having calculated the dominant eigenbeam or beams, the processing unit 8 of the base station 1 decides how to use them for transmission of data signals and assigns a corresponding weight $v_1$ to $v_m$ to each of the multipliers 5. For example, if two dominant long term beams are to be formed, an m dimensional vector $v = w_1 * e_1 + w_2 * e_2$ can be calculated, the weights $v_1$ to $v_m$ in vector $v = (v_1, \ldots, v_m)$ can be applied for weighting the data signals in the m antenna elements.

If only one beam can be resolved at the terminal, the base station 1 can decide to allocate the power to the dominant eigenbeam e(i) only or both to the eigenbeam e(i) and to the instantaneous beam w(i) created according to the short term fading information. Alternatively, several diversity beams can be calculated at the base station and be subsequently transmitted by the base station 1 to the user equipment 2 with data signal distributed according to several long term weight vectors to the different antenna elements 4. The user equipment 2 has to know the coefficients used for the diversity beams for efficient signal detection and decoding. It is possible to extract the dominant beam coefficients from the received data. However, in order to avoid estimation in the user equipment 2, the base station 1 transmits weight information e(1), e(2) indicating the weights in antenna elements used to transmit the long-term signal to the user equipment 2. To this end, the eigenvectors e(i) determined in the processing unit 8 are output to the quantizer 9 for quantization and afterwards to the second encoder 10 for encoding. The thus processed eigenvectors are fed to an input of the multiplexer 31, where they are multiplexed with the other signals that are to be transmitted to the user equipment 2.

The processing unit 8 may be used at the same time for a DPCCH (dedicated physical control channel) decoding, which decodes data transmitted in uplink frames.

For the pilot signal, two orthogonal dedicated pilot channels can be used, one directed with a long term beam and one with an instantaneous beam. The user equipment 2 then signals which one to use for a particular slot. The use of SW-STTD (Soft-Weighted Space Time Transmit Diversity), as described for example in the above cited "Soft-Weighted Transmit Diversity for WCDMA", is also possible. In this case, in relatively slowly varying channels the instantaneous beam is likely to give better gains, while in very slow channels both, the dominant eigenbeam and the instantaneous beam, point roughly to the same direction.

In the simplest case, if only one weight vector is used in the transceiver, Mode 2 dedicated pilot channels can be used. The base station 1 transmits only one beam, which may be a linear combination of instantaneous beam and long term beam. For transmission of information in the downlink, also Mode 1 may be used.

Figure 3:
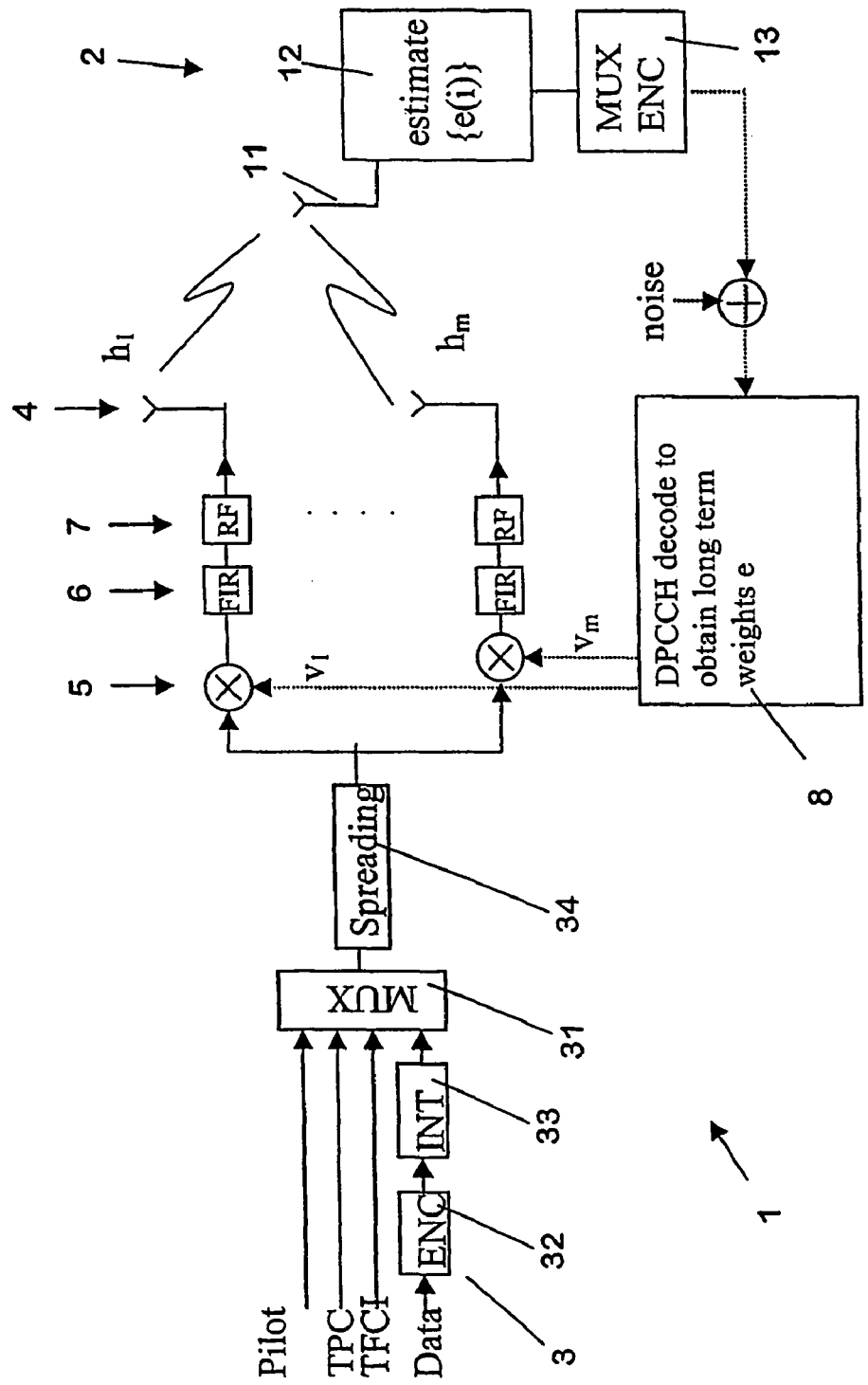
FIG. 3 illustrates the second method according to the invention.

Next, an embodiment according to the second method of the invention illustrated in FIG. 3 is described.

FIG. 3 shows just like FIG. 2 a base station 1 and a user equipment 2 of a UMTS network with WCDMA. The corresponding components are denoted with the same reference numbers as in FIG. 2. However, in the part of FIG. 3 with the base station 1, the connection of the processing unit 8 to the multiplexer 31 via quantizer 9 and encoder 10 is missing. Instead, a multiplexing and encoding unit 13 forming part of the user equipment 2 and connected to the output of the processing unit 12 of the user equipment is shown. Moreover, in FIG. 3 the processing unit 8 of the base station 1 does not comprise means for estimating eigenvectors. In this embodiment, such means are comprised in the processing unit 12 of the user equipment 2.

The supply of signals received by the data supply unit 3 of the base station 1 from the network to the antenna elements 4 of the base station 1 is the same as described with reference to FIG. 2.

The processing in the processing unit 8 of the base station 1 and in the user equipment 2 and the transmission between them, however, is different.

In parallel to transmitting data signals, an orthogonal pilot sequence is transmitted from each base station antenna element 4 as signal to the antenna element 11 of the user equipment 2. With the received signals, the processing unit 12 of the user equipment 2 is able to estimate the long term spatial covariance matrices of the dominant temporal taps. The long term channel properties change slowly over time, therefore a forgetting factor $\rho$ is applied to the long term spatial covariance matrix of the n-th dominant temporal tap with the equation:

$$R_n(i)=\rho R_n(i-1)+(1-\rho)h_n(i)h_n^H(i),$$

where i denotes the slot number and $h_n$ the vector of spatial channel estimation of the n-th temporal tap. As an example, eigenanalysis as described with reference to FIG. 2 or an independent component analysis is employed for determining the eigenvectors e(i) of the matrices and thereby the required weighting coefficients. To avoid the computation of the correlation matrix, Singular Value Decomposition and subspace tracking can be applied directly using the channel estimates h(i).

Each long term beam (diversitybeam) is a vector e(i) of complex numbers. With M antenna elements, for each selected eigenbeam only M−1 weights have to be transmitted for determining the desired direction of the beams. Therefore, the size of the vector equals the number of antenna elements minus 1. Real and imaginary part of each vector element are quantized with $N_{quant}$ bits. Thus, for the transmission of one beam $N=(M-1)*2*N_{quant}$ bits are required. Here, with M=4 and $N_{quant}=4$, N=3*2*4=24 bits are required. Hence, the feedback of two long term diversity beams needs 48 feedback bits. Basically any quantization and signaling technique can be used, for example those used currently in Mode 1 and Mode 2 closed-loop transmit diversity concepts.

Relevant information in the diversity vectors e(i) belonging to the selected diversity beams is transmitted to the base station 1 as bursts. CRC information is added. Each burst is multiplexed using the WCDMA multiplexing and coding chain with other data signals input by the user of the user equipment 2 and to be transmitted to the base station 1. Out of the multiplexed data, Turbo or convolutionally coded frames are generated, thereby maximizing the coding gain for the long term feedback information. Multiplexing and coding are carried out in the multiplexing and encoding unit 13 of the user equipment 2.

The coded frames are transmitted from the multiplexing and encoding unit 12 of the user equipment 2 to the base station 1, where they are decoded and demultiplexed in the processing unit 8. For decoding a DPCCH (dedicated physical control channel) decoding is carried out, which decodes the uplink frame to get i.a. the long term information e(i). If an error is detected in the processing unit 8 by evaluating the CRC information, the base station 1 requests new measurement and signalling from the user equipment 2 before applying the new weights $v_1$ to $v_m$ to the multipliers 5. With this approach, no new frame format is necessary in the uplink, and the long-term information is made sufficiently reliable to the user equipment 2 to avoid estimation problems when receiving the dedicated channel. Moreover, the concept uses the signal processing techniques already incorporate to terminals that support the two-element feedback mode transmit diversity techniques.

If no error was detected, the decoded diversity vector information e(i) is used in the base station 1 for forming beams in the desired directions by assigning corresponding weights $v_1$ to $v_m$ to the multipliers 5 for transmitting a data signal from the antenna elements 4.

The coded long term feedback signals can be generated and transmitted only when requested by the network. To this end, a particular measurement request is transmitted from the base station 1 via a downlink signalling channel (dedicated or common channel) to the user equipment 2. As a result, the measurement results, obtained either by off-line processing before the request or after the request, are then reported to the base station 1 as described above. The signal processing and signalling requirements are similar to those needed for handoffs. The downlink signalling channel can be implemented with the existing service multiplexing and rate matching concept of WCDMA systems.

The user equipment 2 can use the vector of spatial channel estimation $h_n$ of the n-th temporal tap in addition for estimating the short term antenna weight/beamforming vector w(i) as described for example in the above cited document "Closed-loop transmit diversity techniques for multi-element transceivers". In particular, the transmitted long term feedback information e(i), assumed to be received and applied correctly in the base station 1, can be used as additional information for the calculation of short term weight vectors w(i) as soon as signals are received with weighting according to said long term information. The short term feedback information w(i) for beam weighting is transmitted as layer 1 signal, but it can equally be transmitted together with the long term feedback information e(i) in encoded frames.

Having received the dominant eigenbeam or beams from the terminal, the base station 1 decides how to use them for transmission of data signals and assigns a corresponding weight $v_1$ to $v_m$ to each of the multipliers 5. For example, if two dominant long term beams are to be formed by feedback, and when short term feedback w1 and/or w2 is received from the terminal, an m dimensional vector $v=w_1*e_1+w_2*e_2$ can be calculated at the transceiver, and the weights $v_1$ to $v_m$ in vector $v=(v_1, \ldots, v_m)$ can be applied for weighting the data signals in the m antenna elements.

For simplicity the time index has been omitted from the explanation. It is understood, however, that the terminal takes into account signalling and decoding delays (if any) when determining the feedback information. For example, if both short and long term information is sent in frame t, and if there is one frame decoding delay for long term information, the short term information sent in frame t can be calculated based on long term weights in frame t−1.

If there is no short term feedback information w(i) available, the base station 1 can transmit data signals to the user equipment 2 using any number of diversity beams. For example, the information can be distributed to the beams by using space-time coding, like STTD or any other suitable coding. If both, coded long term feedback and short term feedback is present, the user equipment 2 can determine the optimal complex coefficient for weighting the diversity beams. With reliable long term feedback this coefficient can be calculated using common channels, and weight verification can be applied to the complex coefficient by using beam specific pilot signals.

The invention claimed is:

1. A method for controlling the weighting of a data signal in the at least two antenna elements of a multi-element transceiver of a telecommunications network, which data signal is to be transmitted by at least one weighting vector from the transceiver to a terminal, and which antenna elements form at least two transmit paths to the terminal, the method comprising:
    transmitting signals via each transmit path to the terminal;
    receiving from the terminal a determined value indicative of the short term variations of the signals for each transmit path;
    estimating based on the received values coefficients indicative of the stationary structure of the signals received at the terminal; and
    weighting the data signal in the antenna elements with the coefficients.

2. A method according to claim 1, wherein the values indicative of short term variations are weight vectors based on essentially instantaneous channel measurements.

3. A method according to claim 1, wherein estimating coefficients indicative of the stationary structure in the transmitted signal comprises
    estimating from the received values spatial signal covariance matrices using at least two received samples for each transmit path and
    calculating the estimating coefficients from the spatial signal covariance matrices, the estimating coefficients constituting coefficients used for controlling the weighting of the data signal in the antenna elements, the antenna, or the transceiver.

4. A method according to claim 2, wherein the diversity vectors are eigenvectors calculated by eigenanalysis of the spatial signal covariance matrices.

5. A method according to claim 1, wherein the estimating of coefficients indicative of the stationary structure in the transmitted signal comprises a Finite Impulse Response filtering or an Infinite Impulse Response filtering applied to received samples or to respective spatial signal covariance matrices estimated from the received values.

6. A method according to claim 1, wherein the received values used for estimating the coefficients include short term weight vectors and/or signal statistics, wherein the estimated coefficients are transmitted to the terminal, and wherein the terminal uses short term feedback to weight or distribute the transmitted information in or to at least two short term weight vectors.

7. A method according to claim 1, wherein weights corresponding to a stationary weight vector(s) used in the transceiver are transmitted to the terminal and wherein the terminal uses transmitted weights and channel estimates ($h_1 \ldots h_n$) of the transmit paths between the transmitting antenna elements of the transceiver and the receiving antenna elements of the terminal to calculate effective received channels.

8. A method according to claim 7, wherein the effective received channels are used in the terminal for calculating short term feedback.

9. A method according to claim 1, wherein for a soft handover of a terminal from a first transceiver to a second transceiver, each of the transceivers determines the coefficients for weighting data signals in the antenna elements of the respective transceiver with weights corresponding to the coefficients and wherein each of the transceivers signals the weights corresponding to the coefficients to the terminal.

10. A use of a method according to claim 1 in a WCDMA system.

11. The method according to claim 1, wherein the step of transmitting signals comprises transmitting signals to the terminal via each transmit path together with information on long term beams currently used for transmitting the signals;
    the step of receiving a determined value indicative of the short term variations comprises receiving for each transmit path short-term coefficients determined by the terminal based on the effective channels formed by long term beam coefficients corresponding to the information on long-term beams and on channel measurements;
    the step of estimating comprises estimating based on the received short-term coefficients long-term coefficients indicative of the spatial stationary structure of the signals received at the terminal; and
    the step of weighting comprises forming a beam as a combination of an instantaneous beam and of an eigenbeam.

12. A method according to claim 11, wherein the beam is formed by the transceiver as a linear combination of the short-term coefficients and the long-term coefficients.

13. A method for controlling the weighting of a data signal in the at least two antenna elements of a multi-element transceiver of a telecommunications network, which data signal is to be transmitted by at least one weighting vector from the transceiver to a terminal, and which antenna elements form at least two transmit paths to the terminal, the method comprising:
    transmitting signals via each transmit path to the terminal;
    receiving from the terminal a determined set of coefficients for each transmit path in a burst, the set of coefficients being indicative of a dominant stationary structure in the signals received at the terminal;
    and
    controlling the weighting of a data signal in the antenna elements of the transceiver with the coefficients.

14. A method according to claim 13, wherein the transmitted structure coefficients form dominant diversity vectors of estimated long term spatial signal covariance matrices.

15. A method according to claim 13, wherein the transmitted structure coefficients form eigenvectors of estimated long term spatial signal covariance matrices.

16. A method according to claim 13, wherein the coefficients are calculated by using an independent component analysis.

17. A method according to claim 13, wherein the coefficients are calculated by a higher-order generalization of eigenanalysis which makes use of mean and covariance information in a received signal and designates dominant weighting vectors.

18. A method according to claim 13, wherein the coefficients are encoded before transmission.

19. A method according to claim 13, wherein the structure coefficients are multiplexed with other signals to be transmitted to the transceiver which multiplexed signals are encoded before transmission.

20. A method according to claim 13, wherein an error detection signal is transmitted together with the structure coefficients from the terminal to the transceiver.

21. A method according to claim 13, wherein in the terminal the structural coefficients are used together with channel estimates ($h_1 \ldots h_m$) of the transmit paths between transmitting antenna elements of the transceiver and the receiving antenna elements of the terminal to calculate effective received channels.

22. A method according to claim 21, wherein the effective channels are used in the terminal to calculate values indicative of short term variations in the channels, wherein the terminal signals the calculated short term values to the transceiver, and wherein the transceiver weights the data signals in the antenna elements of the transceiver with a combination of the received coefficients and the received short term values.

23. The method according to claim 13, wherein in case the terminal is in soft handover with the transceiver and at least a second transceiver and the data signal is to be transmitted from at least one of the transceivers to the terminal, the method further comprises:
receiving at the terminal signals transmitted by the transceiver and at least the second transceiver via each transmit path;
determining at the terminal separately for each transceiver a set of coefficients for each transmit path from the respective transceiver indicative of the dominant stationary structure in signals received from the respective transceiver; and
transmitting the set of coefficients separately to the respective transceiver.

24. A method according to claim 23, wherein the coefficients are transmitted in bursts to the transceivers.

25. A method according to claim 23, wherein the transmitted coefficients form dominant diversity vectors of an estimated long term spatial signal covariance matrices.

26. A method according to claim 25, wherein the dominant diversity vectors are eigenvectors of the long term spatial signal covariance matrices.

27. A method according to claim 23, wherein the coefficients are calculated by using an independent component analysis.

28. A method according to claim 23, wherein the structure coefficients are calculated by a higher-order generalization of eigenanalysis which makes use of mean and covariance information in a received signal and designates dominant weighting vectors.

29. A method according to claim 23, wherein the structure coefficients are encoded before transmission.

30. A method according to claim 23, wherein the coefficients are multiplexed with other signals to be transmitted in an uplink with a multiplexed signal being encoded before transmission.

31. A method according to claim 23, wherein an error detection signal is transmitted together with coefficients from the terminal to the transceivers.

32. A method according to claim 23, wherein in the terminal determined coefficients are used together with channel estimates of the transmit paths between the transmitting antenna elements of the transceivers and the receiving antenna elements of the terminal to calculate effective received channels.

33. A method according to claim 32, wherein the effective channels are used in the terminal to calculate the values indicative of short term variations in the channels, wherein the terminal signals the calculated short term values to the transceivers, and wherein the transceivers weight the data signals in the antenna elements of the transceivers with a combination of received coefficients and short term values.

34. The method according to claim 13, wherein in case the terminal is in soft handover with the transceiver and at least a second transceiver and the data signal is to be transmitted from both transceivers to the terminal, the method further comprises:
receiving at the terminal signals transmitted by the transceiver and at least the second transceiver via each transmit path;
determining at the terminal a set of coefficients for each of the transmit paths of both of the transceivers indicative of the dominant stationary structure in the signals received from both transceivers;
transmitting the same determined sets of coefficients to both of the transceivers.

35. An apparatus comprising:
a transmission component configured to cause a transmission of signals via at least two transmit paths to a terminal, the at least two transmit paths being formed by at least two antenna elements of a multi-element transceiver;
an estimating component configured to estimate coefficients indicative of the stationary structure of the signals received by the terminal based on values indicative of the short term variations of the signals for each transmit path received from the terminal; and
a weighting component configured to weight the data signal in the antenna elements with the coefficients.

36. A transceiver for a telecommunications network comprising at least two antenna elements and an apparatus according to claim 35.

37. A system comprising at least one multi-element transceiver according to claim 36 and at least one terminal.

38. An apparatus comprising:
a reception component configured to receive signals transmitted by a multi-element transceiver via at least two transmit paths, the at least two transmit paths being formed by at least two antenna elements of the transceiver;
a determination component configured to determine a set of coefficients for each transmit path indicative of a dominant stationary structure in the received signals; and
a transmitting component configured to cause a transmission of the coefficients to the transceiver in a burst for enabling the transceiver to control the weighting of a data signal in the antenna elements of the transceiver with the coefficients.

39. A terminal for a telecommunications network comprising at least one antenna element and an apparatus according to claim 38.

40. An apparatus comprising:
- a transmission component configured to cause a transmission of signals via at least two transmit paths to a terminal, the at least two transmit paths being formed by at least two antenna elements of a multi-element transceiver;
- a reception component configured to receive from the terminal a determined set of coefficients for each transmit path in a burst, the set of coefficients being indicative of a dominant stationary structure in the signals received at the terminal; and
- a control component configured to control the weighting of a data signal in the antenna elements of the transceiver with the coefficients.

41. A transceiver for a telecommunications network comprising at least two antenna elements and an apparatus according to claim 40.

42. A system comprising at least one multi-element transceiver according to claim 41 and at least one terminal.

43. An apparatus comprising:
- means for transmitting signals via at least two transmit paths to a terminal, the at least two transmit paths being formed by at least two antenna elements of a multi-element transceiver;
- means for receiving from the terminal a determined value indicative of the short term variations of the signals for each transmit path;
- means for estimating based on the received values coefficients indicative of the stationary structure of the signals received at the terminal; and
- means for weighting the data signal in the antenna elements with the coefficients.

44. An apparatus comprising:
- means for transmitting signals via at least two transmit paths to a terminal, the at least two transmit paths being formed by at least two antenna elements of a multi-element transceiver;
- means for receiving from the terminal a determined set of coefficients for each transmit path in a burst, the set of coefficients being indicative of a dominant stationary structure in the signals received at the terminal; and
- means for controlling the weighting of a data signal in the antenna elements of the transceiver with the coefficients.

* * * * *